United States Patent

Dal Monte

[11] Patent Number: 5,085,488
[45] Date of Patent: Feb. 4, 1992

[54] SEAT BACKREST WITH A LAYERED STRUCTURE

[75] Inventor: Antonio Dal Monte, Rome, Italy

[73] Assignee: Fiat Auto SpA, Turin, Italy

[21] Appl. No.: 742,530

[22] Filed: Aug. 7, 1991

Related U.S. Application Data

[63] Continuation of Ser. No. 548,540, Jun. 5, 1990, abandoned.

[30] Foreign Application Priority Data

Jun. 5, 1989 [IT] Italy .................. 67552 A/89

[51] Int. Cl.⁵ .................................................. A47C 7/02
[52] U.S. Cl. .................................. 297/460; 297/452
[58] Field of Search ............... 297/460, 459, 284 R, 297/455, 452, 284 E, 284 C

[56] References Cited

U.S. PATENT DOCUMENTS

| | | | |
|---|---|---|---|
| 3,000,020 | 9/1961 | Lombard et al. | 297/452 X |
| 3,205,515 | 9/1965 | Vanger | 297/452 X |
| 3,587,569 | 6/1971 | Madsen | 297/284 X |
| 3,727,980 | 4/1973 | Tischler | 297/452 |
| 4,555,137 | 11/1985 | Goldner | 297/460 X |
| 4,615,561 | 10/1986 | Nomura | 297/460 X |
| 4,696,516 | 9/1987 | Yeum | 297/460 X |
| 4,793,574 | 12/1988 | Fenske et al. | 297/460 X |
| 4,890,885 | 1/1990 | Grossmann | 297/460 X |
| 4,929,026 | 5/1990 | Barbelet | 297/454 |

*Primary Examiner*—Jose V. Chen
*Attorney, Agent, or Firm*—Sughrue, Mion, Zinn, Macpeak & Seas

[57] ABSTRACT

The backrest is composed of a rear layer of high rigidity and a softer front layer, the latter having transverse recesses or cavities in its face which is in contact with the rear layer. The backrest is suitable for front and rear seats.

2 Claims, 3 Drawing Sheets

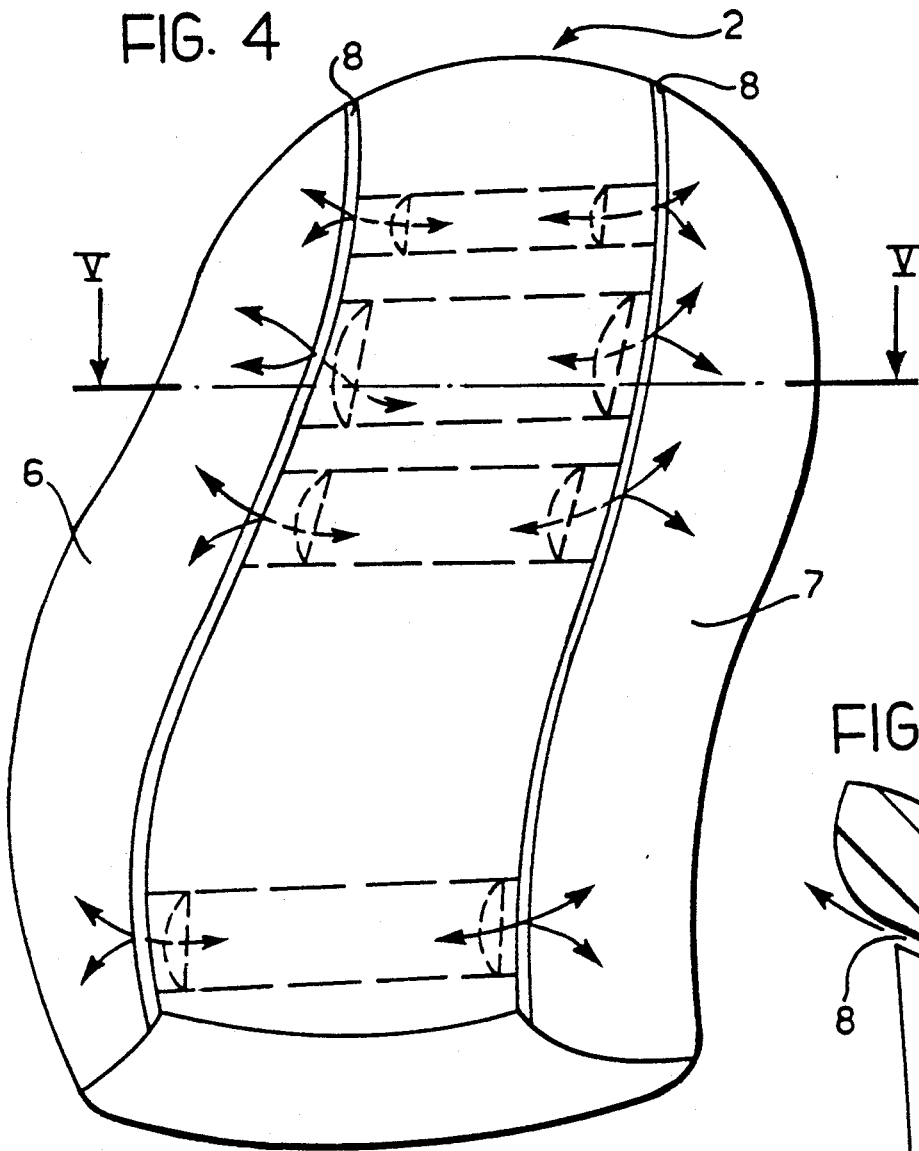
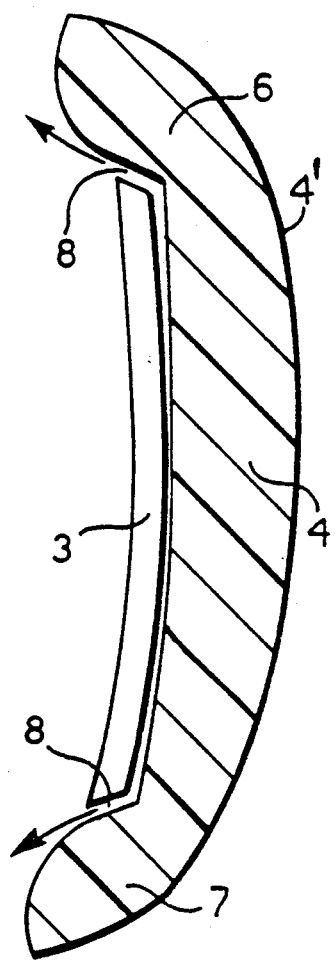

SEAT BACKREST WITH A LAYERED STRUCTURE

This is a continuation of application No. 07/548,540 filed July 5, 1990 now abandoned.

BACKGROUND OF THE INVENTION

The present invention relates to seat backrests with layered structures and has been developed specifically for the production of backrests for front or rear seats for motor vehicles.

The main function of the backrest of a seat is to provide support for the vertebral column of the occupant so as to offer the required comfort: in other words, the backrest of a seat provides differentiated support for the vertebral column of the occupant so as to satisfy his anatomical and functional requirements.

The production of seat backrests of this type, particularly for automotive use, leads to a search for the best compromise between the need to provide the best driving and travelling comfort and at the same time to reduce the complexity and hence the cost of the backrest structure, as well as the transverse size (thickness) of the backrest in order to make more useful space available within the passenger compartment of the motor vehicle.

A motor vehicle seat comprising a squab and a backrest having padding with a layered structure has already been proposed by the Applicant (Italian patent application No. IT-A-67887/88).

For cars of a certain class, it has already been proposed to provide car seats with backrests including mechanisms by means of which the profile of the backrest in the vertical direction can be modified in order to enable the backrest to be adapted to the typical shape of any occupant's vertebral column. However, these systems are complicated and expensive, and also require space within the backrest such that the backrest has to be very thick in order to retain sufficient padding and hence travelling comfort, or the padding has to be thinner in order to keep the overall thickness of the backrest the same as that of a backrest without a mechanism for adapting its shape, with the result that the backrest is less comfortable.

SUMMARY OF THE INVENTION

Starting from the problems set out above, the invention aims to provide a backrest for a seat, particularly for motor cars, which provides suitable, differentiated support for the occupant's back without complicated additional mechanisms.

According to the invention, this object is achieved by means of a backrest of the type described above but having the further characteristics including a mass of padding with a layered structure composed of at least two layers with different elasticities, wherein at least one said layer has cavities in its surface which is in contact with the adjacent layer.

The dependent claims describe particularly advantageous embodiments of the invention.

BRIEF DESCRIPTION OF THE DRAWINGS

The invention will now be described in detail, by way of non-limiting example, with reference to the appended drawings in which:

FIG. 4 is a perspective view of the backrest according to the invention;

FIG. 5 is a section of the backrest of FIG. 4, taken in the plane V—V;

DETAILED DESCRIPTION OF THE INVENTION

Figure 1:
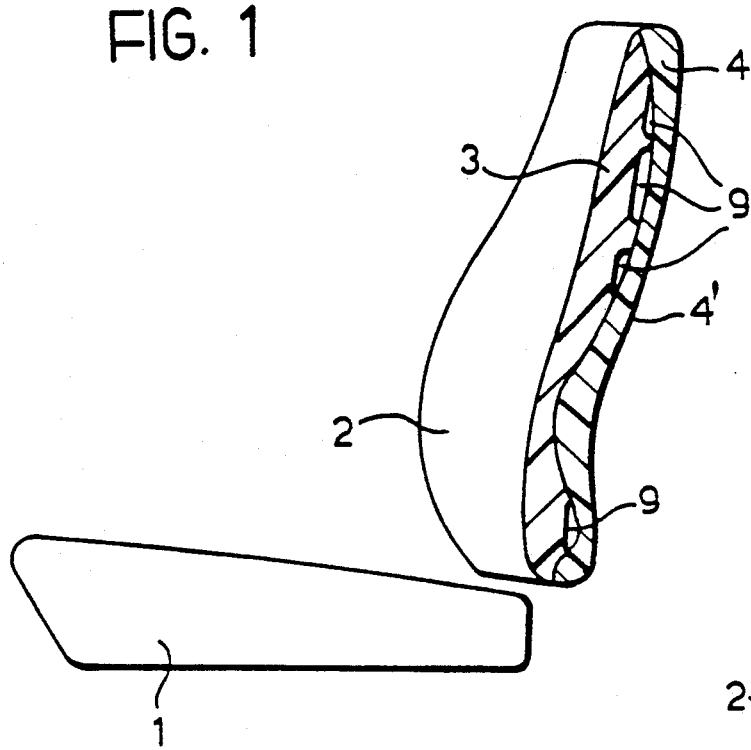
FIG. 1 is a partially-sectioned side view of a seat including the backrest according to the invention, in an undeformed condition.

The backrest 2 according to the invention is constituted by a rigid, rear support base 4'. This base 4' can support any mechanical devices (not shown in the drawings) for inclining the backrest, for supporting the headrest, etc. A layer 4 of foam of fairly high rigidity (for example, polyethylene foam) is glued to the base 4' and has an accentuated curvature along its vertical axis so as to form an adequate lumbar and sacral support for the occupant's back; in particular, the front profile of the layer 4 ("front" and "rear" are intended to relate to the normal direction of travel of the vehicle) has quite a pronounced double-"S"- shape defining upper and lower transverse concave recesses so that users whose backs are characterised by an accentuated curvature can find in the backrest a surface which is, so to speak, "complementary" to the shapes of their own backs.

A layer 3 of foam which is softer and hence more yielding than the adjacent rear layer 4 is glued to the front face of the rigid layer 4.

In correspondence with the upper end of the backrest as far as an intermediate position and with the lower end, that is, in correspondence with the dorsal and lumbar regions of the occupant's vertebral column, the soft front layer 3 has horizontal recesses or cavities 9 which interrupt the surface of contact and adhesion between the two layers 3 and 4. The rear surface of the soft layer 3 has the same double-"S"-shape as the front surface of the rigid layer 4, whilst the profile of the front surface of the soft layer 3 is substantially straight in order to facilitate subsequent upholstery operations and respond to certain aesthetic requirements.

The two layers 2 and 4 thus have varying transverse thicknesses in parallel horizontal planes.

As a result of the provision of the horizontal cavities 9, the soft layer 3 has a differentiated rigidity in a vertical direction so as to ensure the maximum possible comfort for any occupant, whatever the shape of his back.

Figure 2:
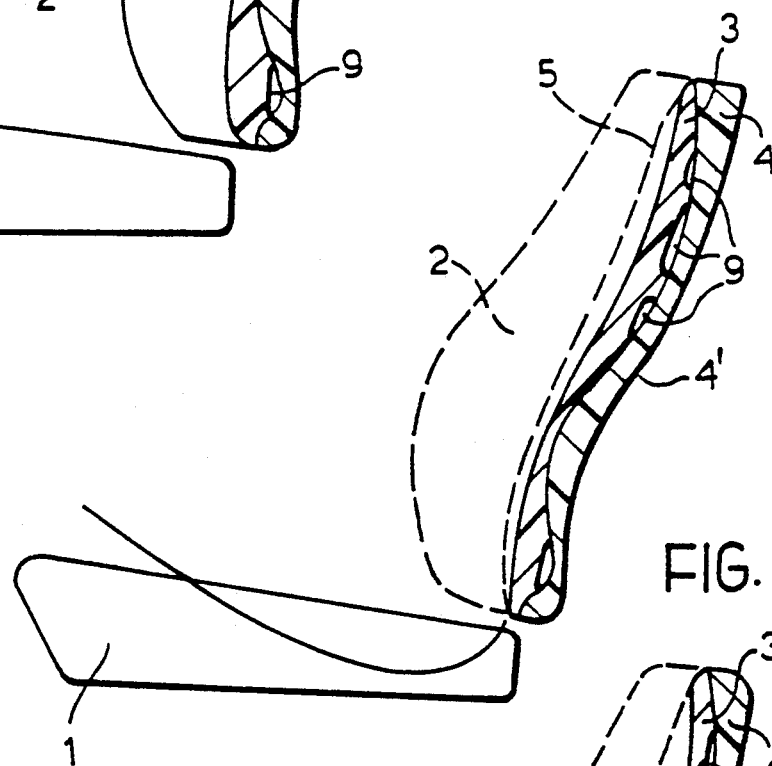
FIG. 2 is a partially-sectioned side view of a seat including the backrest according to the invention, in a deformed condition.

FIG. 2 shows the deformation of the two layers 3 and 4 caused by a user with a substantially straight back. The broken line 5 shows the profile of the front surface of the undeformed backrest. It can be seen that the volumes of the cavities of air pockets 9 are smaller than in the unloaded condition.

Figure 3:
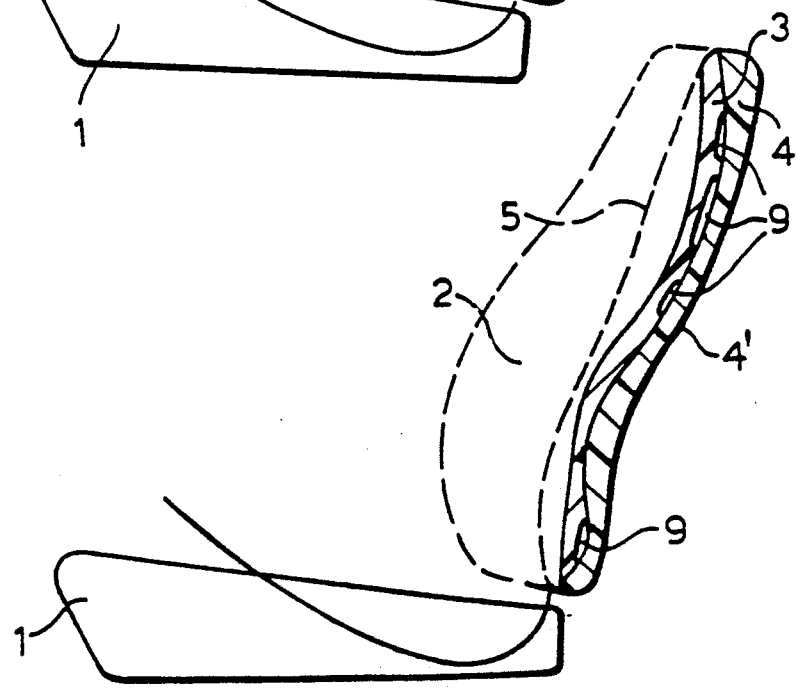
FIG. 3 is similar to FIG. 2 and shows another

FIG. 3 shows the backrest deformed by an occupant with accentuated kyphosis (dorsal curvature) and lordosis (lumbar concavity).

It can be seen that the soft layer 3 can also adapt to the back of such an occupant; the air pockets 9 are further reduced and the front profile of the layer 3 is much more curved, without this layer being completely squashed at any point such as could reduce the feeling of comfort of the occupant.

The backrest according to the invention is suitable for both rear seats and front seats. In the latter case, it may be convenient to provide the backrest with two lateral restraining pads 6, 7 (see FIGS. 4 and 5) which ensure the lateral restraint of occupants in the event of lateral forces induced by certain driving conditions. The two lateral pads 6, 7 are arranged so as to leave a lateral space 8 (some 1 or 2 cm wide) so that the air in the cavities remains in direct communication with the outside. This has the further advantage of allowing the ventilation of the backrest and hence greater comfort in hot conditions. The ventilation is facilitated by the movement of the occupant's body which acts as a "pump", the air pockets 9 being squashed and allowed to expand by the movements of the back due to oscillations of the vehicle, so as to cause a kind of forced circulation of air in an adjacent region between the back and the backrest which can remove some of the occupant's heat.

A further advantage of the backrest according to the invention concerns the elimination of all the movable metal elements (springs, meshes, hooks) which currently constitute the rear restraining systems of the backrest.

Figure 6:
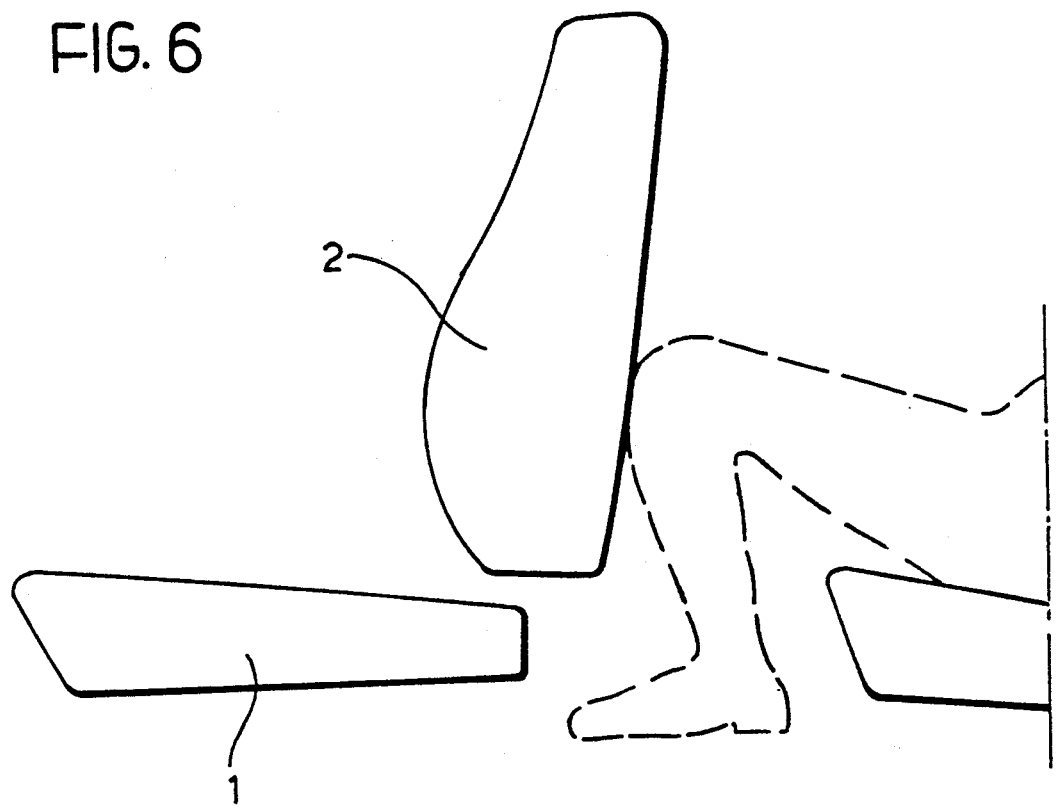
FIGS. 6 and 7 show schematically the space available between the front and rear seats with backrests according to the prior art and according to the invention respectively.
Figure 7:
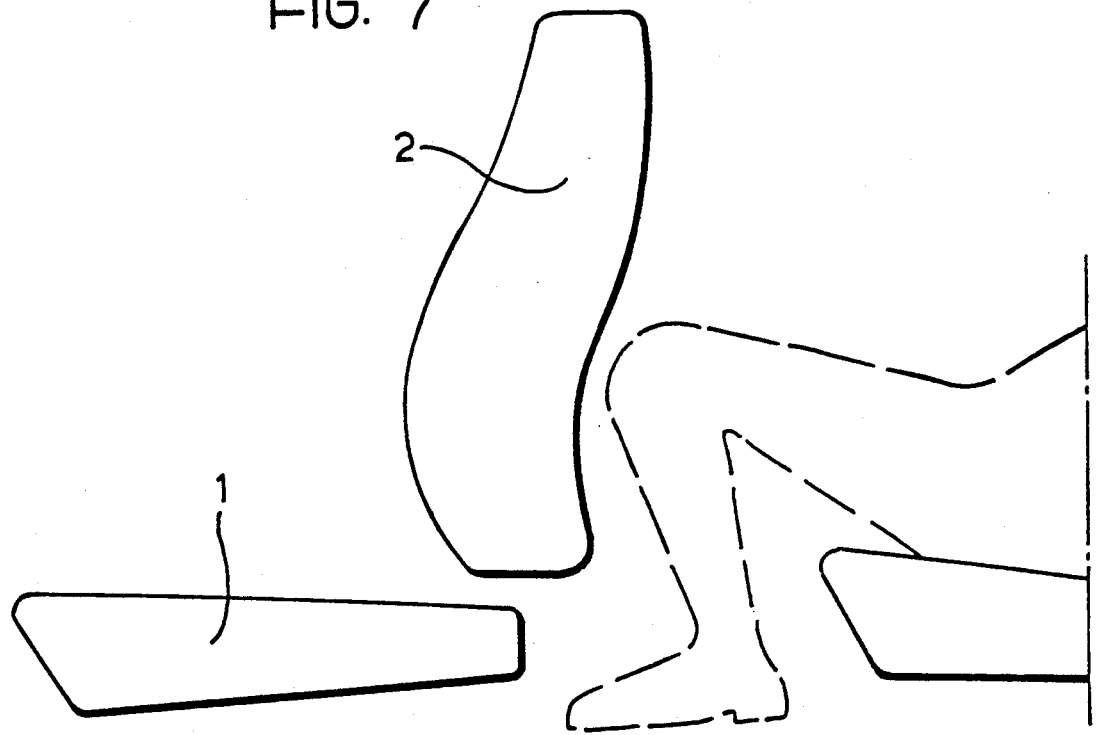

Moreover, it should be noted that the rigid base 4' can be shaped so as to conform to the curved shapes of the layers 3 and 4 and this constitutes the further advantage that several centimetres of space are gained for the legs of rear occupants (see FIGS. 6 and 7) without a simultaneous reduction in the transverse thickness of the padding of the front backrest and hence without a simultaneous reduction in the comfort of the front-seat occupants.

What is claimed is:

1. A backrest for a seat comprising a rigid base member having a curved profile defining upper and lower transverse concave recesses in a front surface thereof and first and second layers of foam material with said first layer having a rigidity greater than said second layer;

said first layer having front and rear surfaces with curved profiles substantially the same as the curved profile of said base member, said rear surface of said first layer being disposed in engagement with said front surface of said base member, said second layer having a substantially straight front surface and a rear surface with a curved profile substantially the same as the curved profile of said front surface of said first layer and disposed in engagement therewith, and said rear surface of said second layer having a plurality of transversely extending, open-ended cavities therein only in areas adjacent said transverse concave recesses, there being no cavities in other areas of said second layer which are not adjacent said recesses.

2. A backrest as set forth in claim 1, further comprising a pair of lateral pads mounted on said base member on opposite sides of said layers and spaced therefrom so as to prevent blockage of said open-ended cavities.

* * * * *